United States Patent [19]

Hyne et al.

[11] Patent Number: 4,506,733
[45] Date of Patent: Mar. 26, 1985

[54] ADDITIVE FOR INCLUSION IN A HEAVY OIL RESERVOIR UNDERGOING STEAM INJECTION

[75] Inventors: James B. Hyne; Peter D. Clark, both of Calgary, Canada

[73] Assignee: Alberta Oil Sands Technology and Research Authority, Edmonton, Canada

[21] Appl. No.: 525,349

[22] Filed: Aug. 19, 1983

[51] Int. Cl.$^3$ .............................................. E21B 36/00
[52] U.S. Cl. ............................... 166/303; 252/8.55 D
[58] Field of Search ........................ 166/266, 272, 303; 208/8 LE, 9, 11 LE; 252/8.55 D

[56] References Cited

U.S. PATENT DOCUMENTS

| 3,946,810 | 3/1976 | Barry | 166/272 |
| 4,048,078 | 9/1977 | Allen | 252/8.55 D |
| 4,393,937 | 7/1983 | Dilgren | 252/8.55 D X |
| 4,466,485 | 8/1984 | Shu | 166/272 |

Primary Examiner—Leland A. Sebastian
Attorney, Agent, or Firm—Millen & White

[57] ABSTRACT

The viscosity of heavy oil may be incrementally reduced over what can be achieved by steam alone, by introducing an aqueous metal salt solution into a reservoir undergoing steam injection. The metal ion is selected from the group consisting of Ti, V, Cr, Mn, Fe, Co, Ni, Cu, Zn, Mo and Al. In a preferred feature CO is also introduced as a second additive, with a further oil viscosity reduction being observed with certain of the metal ions.

2 Claims, 1 Drawing Figure

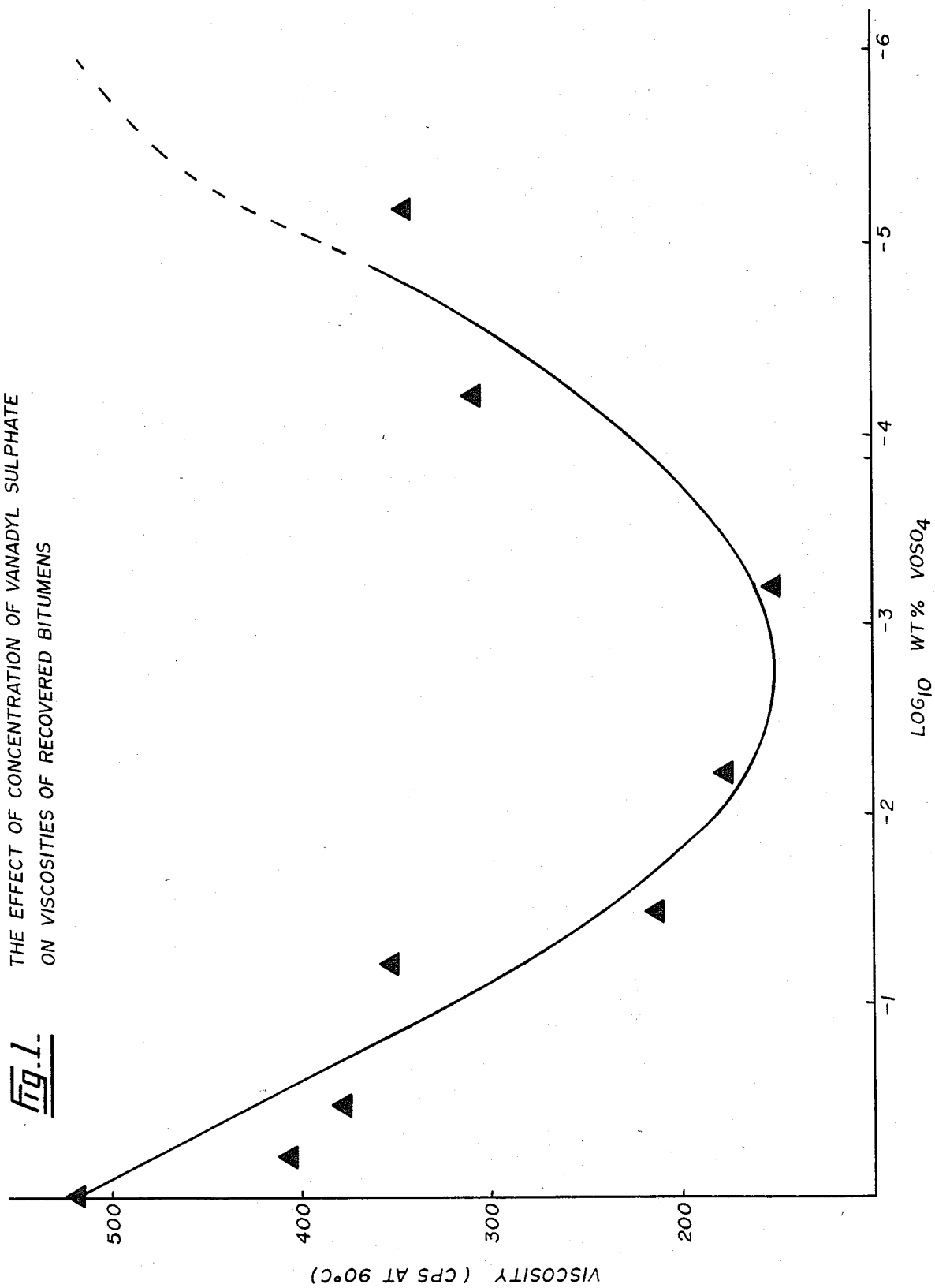

ADDITIVE FOR INCLUSION IN A HEAVY OIL RESERVOIR UNDERGOING STEAM INJECTION

BACKGROUND OF THE INVENTION

1. Field of the Invention

The present invention relates to a process for reducing the viscosity of sulphur-containing heavy oil. The process is intended to be practised while the heavy oil is in place in a subterranean reservoir and is undergoing steam injection. The invention involves introducing one or more specific metal ions into the reservoir, to obtain an incremental reduction in the viscosity of the oil, over that obtained from the heating effect of the steam. In a preferred feature, carbon monoxide (CO) is introduced with the metal ions into the hot reservoir to cause a still further reduction in oil viscosity and improvement in recoverability with selected metal ions.

2. Description of the Prior Art

"Heavy oil" is a term commonly applied to describe oils having a specific gravity less than about 20° API. These oils, which include tar sand bitumen, are not readily producible by conventional techniques. Their viscosity is so high that the oils cannot readily be mobilized and driven to a production well by a pressure drive.

To produce such oils, the industry has resorted to first heating them in situ, to reduce their viscosity to a level where the oil is amenable to displacement. A pressure drive is then used to force the oil through the reservoir to the production well.

One such heating procedure involves injecting steam into the formation. The present invention is practised in conjunction with such steam injection.

Much work has heretofore been carried out to identify suitable additives which could be introduced into a heavy oil reservoir with steam, to obtain an incremental reduction in oil viscosity. In general, this work has centered on the use of solvents, surfactants and gases (such as CO and $CO_2$), as the additives.

We have chosen to try the approach of attempting to chemically induce the fragmentation in situ of the hydrocarbon macromolecules which make up heavy oil. As a first step in this direction, we accepted the widely held view that heavy oil macromolecules are composed of long chains of aliphatic and aromatic groupings linked together, at least in part, by sulphur atoms. We then sought to ascertain an additive which, in an environment such as would exist in a heavy oil reservoir undergoing steam injection, would seem to be capable of selectively cleaving the macromolecules at the sulphur bonds.

BRIEF DESCRIPTION OF THE DRAWING

FIG. 1 is a plot showing the effect of concentration of vanadyl sulphate on viscosities of recovered bitumen.

SUMMARY OF THE INVENTION

In accordance with this invention, it has been discovered that retaining sulphur-containing heavy oil in contact with steam and an aqueous solution of a defined metal salt, at a pressure such as that which would be experienced in a sub-surface reservoir, results in a significant incremental reduction in the oil viscosity, in comparison to what is obtained when the oil is retained in contact with steam alone.

The metal ion in the additive is selected from the group consisting of titanium (Ti), vanadium (V), chromium (Cr), manganese (Mn), iron (Fe), cobalt (Co), nickel (Ni), copper (Cu), zinc (Zn), molybdenum (Mo), and aluminum (Al). The selection of the anion used in the salt is not critical; we have successfully used sulphates for this purpose.

In a further application of the invention, it has been discovered that, if CO is also introduced into the reaction zone, a further reduction in oil viscosity is achieved with selected metal ions.

By way of example, in three tests involving holding (1) heavy oil sand and steam, (2) heavy oil sand, steam and nickel sulphates and (3) heavy oil sand steam, nickel sulphate and CO, together in an autoclave for 14 days at reservoir temperature and pressure, the viscosity of the oil from test (1) was 520 cps, that from test (2) was 322 cps, and that from test (3) was 184 cps.

Broadly stated, the invention is a process for reducing the viscosity of heavy oil, comprising: contacting the heavy oil, at reservoir pressure under substantially anaerobic condition, with an aqueous solution containing at least one metal salt, the metal being selected from the group consisting of Ti, V, Cr, Mn, Fe, Co, Ni, Cu, Zn, Mo and Al, and sufficient steam to maintain the temperature in the reaction zone in the range 150°–300° C.

In a preferred aspect of the invention, a method is provided for reducing the viscosity of heavy oil, comprising: contacting the heavy oil, at reservoir pressure, with an aqueous solution containing at least one metal salt, the metal being selected from the group consisting of Ti, V, Cr, Mn, Fe, Co, Ni, Cu, Zn, Mo and Al, carbon monoxide, and sufficient steam to maintain the temperature in the reaction zone in the range 150°–300° C.

DESCRIPTION OF THE PREFERRED EMBODIMENT

As previously stated, the process has application to heavy oil and would be practised in a reaction zone in a subterranean reservoir under substantially anaerobic condition.

The pressure and temperature in the reaction zone would be those inherent in such a reservoir undergoing steam injection. The pressure can vary widely, depending on the depth of the reservoir and the steam injection pressure. Most reservoirs undergoing steam injection would have a pressure falling within the broad range 70 to 1300 psi.

The reactions involved require a minimum temperature of about 175° C. To be carried out at a reasonable rate. Most reservoirs undergoing steam injection would have a temperature of 150° C.–300° C., which nicely meets the temperature requirement of the reactions involved.

The heavy oil typically has an element composition in the order of: carbon 80–85%; hydrogen 7–12%; sulphur 1–6%; oxygen 0.1–0.5%; nitrogen 0.01–0.5%.

Steam is injected or provided in the reaction zone in an amount in accordance with conventional oilfield thermal recovery practice.

The retention time is not a critical factor. We find retention times in the order of 7 to 28 days are adequate to result in a significant incremental viscosity reduction.

The invention is based on the discovery that the provision in the reaction zone of a metal ion, selected from the group consisting of Ti, V, Cr, Mn, Fe, Co, Ni, Cu, Zn, Mo and Al, will cause reactions to occur which result in an incremental reduction in viscosity of the oil over that obtained from the steam heating alone.

The metal ions are preferably supplied to the reaction zone in the form of aqueous solutions of their common salts (e.g. sulphate or chloride). There is no criticality with respect to the anion selected, as long as the salt is readily soluble in water. A preferred anion is sulphate, due to its relative non-reactivity in situ and its nontoxicity.

The amount of metal salt supplied to the reaction zone is not critical, but useful reductions are obtained using concentrations in the range 0.000001 to 1.0 weight percent of the oil-mineral matrix and most preferably within the range 0.01 to 1.0 weight percent. No significant advantage has been noted by working at higher concentrations. The results arising from the lowest concentrations differ little from those obtained without added metal salt.

In FIG. 1, oil viscosities arising from a series of tests using varying amounts of vanadyl sulphate solution under otherwise constant conditions, have been plotted. It will be noted that the curve produced has a minimum value for vanadyl sulphatwe at which maximum viscosity reduction takes place. This phenomenon may exist for other metal ions as well, although this has not been determined.

In an additional feature of the invention, it has further been discovered that the introduction of CO into the reaction zone will additionally reduce the viscosity of the oil. The amount of CO provided is not critical. We have successfully used amounts of CO up to 1.0 weight percent on the oil-mineral matrix. Use of amounts greater than 1.0 weight percent CO is not disadvantageous.

EXPERIMENTAL PROCEDURE

The following experimental work is included to demonstrate the operability and preferred conditions of the process of the present invention.

150 g samples of homogenised whole oil sand core were treated in a pressure autoclave having a volume of approximately 300 ml. Agitation was not employed. The autoclave and its contents were thoroughly flushed with nitrogen or carbon monoxide before reaction to ensure anaerobic conditions. Distilled water was added to the autoclave in an amount to obtain a ratio of between 0.2 and 0.6 oil sand bitumen to water. The distilled water contained, in solution, the required metal salts in amounts varying between 0.000001 and 1% expressed in terms of mass charge of the material in the vessel. In those runs wherein carbon monoxide was used together with the metal salt solutions, the amount was usually about 0.15–1.0% expressed in terms of mass charge of material in the vessel. This corresponded to 15–100 psi pressure of CO in the vessel at 20° C.

The loaded reaction vessel was heated in a thermostated high temperature air oven. Temperature control was maintained to ±2° C. throughout the reactions. Produced gas sampled after cooling the vessel to room temperature were analyzed by gas-liquid chromatography. The condensed phase material (mineral plus hydrocarbon) was extracted to recover the oil using dichloromethane. A drying agent was used to remove water and prevent loss of volatile components. Special care was taken to ensure removal of residual extracting solvent and drying agent fines since both have been shown to have significant effect at low concentration levels on viscosity of the recovered oil. Viscosities were determined at 90° C. using a thermostated Brookfield cone/plate type viscometer.

EXAMPLE I

This example illustrates the ability of vanadyl sulphate to reduce the viscosity of the oil, limit the $H_2S$ produced over short time periods, and enhance the amount of $CO_2$ released.

Whole oil sand core samples were subjected to steam treatment over an extended period of time, both with and without the addition of a metal salt solution. The produced gases evolved (expressed in mls/1000 g of bitumen contained in the whole core being steamed) are shown in Table I. It should be noted that treatment of vanadyl ion does not result in any increase in vanadium content of the recovered oil.

TABLE I

| EFFECTS OF STEAM TREATMENT OF OIL SAND CORE SAMPLE WITH AND WITHOUT ADDED VANADYL SULPHATE SOLUTION AT 240° C. | | | | | | | |
|---|---|---|---|---|---|---|---|
| | Time (Days) Steaming | | | | | | |
| | 0 | 7 | | 14 | | 28 | |
| | | With | Without | With | Without | With | Without |
| Produced Gases | | (mls/100 g of bitumen) | | | | | |
| $H_2S$ | — | 26 | 31 | 2 | 6 | 90 | 75 |
| $CO_2$ | — | 8014 | 6330 | 9127 | 7980 | 8581 | 6392 |
| Liquid Properties | | | | | | | |
| Viscosity (cps at 90° C.) | 520 | 445 | 503 | 406 | 579 | 371 | 490 |
| Vanadium (ppm) | 230 | 125 | 147 | 121 | 152 | 193 | 125 |

EXAMPLE II

This example illustrates the operability of nickel sulphate to incrementally reduce viscosity of the oil, as well as demonstrating the benefit of adding CO as a second additive.

Whole oil sand core samples were treated with steam alone, with added nickel sulphate solution, with nickel sulphate solution and carbon monoxide, and with carbon monoxide alone. The reaction was allowed to proceed for 14 days at a temperature of 240° C. The results are outlined in Table II.

TABLE II

| EFFECT OF STEAM TREATMENT OF OIL SANDS CORE SAMPLE WITH ADDED NICKEL SULPHATE IN CONJUNCTION WITH CARBON MONOXIDE | | | | |
|---|---|---|---|---|
| | Produced Gases (mls/1000 g of Bitumen) | | | |
| | With Water | With $NiSO_4$ | With $NiSO_4$ + CO | With CO Alone |
| $H_2S$ | 6 | 9 | 28 | 600 |
| $CO_2$ | 7840 | 6960 | 16,410 | 28,260 |
| Liquid Properties | | | | |

TABLE III

VARIATION OF METAL SALT[a] IN AQUATHERMOLYSIS OF ATHABASCA OIL SAND, 14 d, 240° C.

| Added Metal Ion | $Al^{3+}$ | $Ti^{3+}$ | $VO^{2+}$ | $Cr^{3+}$ | $Mn^{2+}$ | $Fe^{2+}$ | $Co^{2+}$ | $Ni^{2+}$ | $Cu^{2+}$ | $Zn^{2+}$ | $MoO_4^{2-}$ | Nil |
|---|---|---|---|---|---|---|---|---|---|---|---|---|
| $H_2S$ | 60 | 0 | 2 | 83 | 92 | 22 | 0 | 9 | 0 | 2 | 0 | 7 |
| $H_2$ | 525 | 3146 | 922 | 982 | 242 | 193 | 319 | 366 | 199 | 149 | 293 | 816 |
| $CO_2$ | 5704 | 5966 | 9127 | 5373 | 7152 | 5533 | 5603 | 6960 | 6086 | 5895 | 4786 | 7980 |
| CO | 1 | 3 | 17 | 9 | 5 | 8 | 21 | 22 | 15 | 18 | 95 | 82 |
| $C_{u4}$ | 123 | 88 | 224 | 72 | 89 | 67 | 43 | 136 | 126 | 60 | 86 | 186 |
| $C_{2+}$ | 102 | 93 | 383 | 59 | 118 | 54 | 41 | 70 | 61 | 46 | 142 | 89 |
| TOTAL | 6515 | 9296 | 10650 | 6578 | 7698 | 5877 | 6027 | 7563 | 6487 | 6170 | 5402 | 9160 |
| Liquid Data | | | | | | | | | | | | |
| Viscosity (cps at 90°) | 277 | 238 | 406 | 236 | 250 | 167 | 223 | 322 | 242 | 386 | 197 | 579 |
| % Recovery | 88 | 100 | 97 | 100 | 91 | 99 | 91 | 90 | 100 | 100 | 100 | 99 |
| % Sulphur | 4.95 | 5.08 | 4.93 | 5.17 | 5.12 | 4.99 | 4.78 | 4.82 | 5.05 | 4.53 | | 5.29 |
| V (ppm) | 160 | 143 | 121 | 157 | 153 | 152 | 107 | 151 | 163 | 96 | | 152 |
| Density | 1.027 | | 1.021 | 1.017 | 1.024 | 1.019 | 1.021 | 1.028 | 1.015 | 1.027 | | 1.024 |
| API | 6.35 | | 7.14 | 7.62 | 6.62 | 7.37 | 7.05 | 7.12 | 7.96 | 6.24 | | 6.62 |
| Mol Wt. | 679 | | 663 | 658 | 662 | 601 | 740 | 617 | 713 | 608 | | 644 |

[a] All experiments contain 0.1 M metal ion in aqueous solution

EFFECT OF STEAM TREATMENT OF OIL SANDS CORE SAMPLE WITH ADDED NICKEL SULPHATE IN CONJUNCTION WITH CARBON MONOXIDE

| | With Water | With $NiSO_4$ and water | With $NiSO_4$ + CO + water | With CO Alone + water |
|---|---|---|---|---|
| Viscosity[a] (cps at 90° C.) | 520 | 322 | 184 | 380 |

[a] initial value - 500 ± 30 cps at 90° C.

EXAMPLE III

The data in Table III illustrates the relative effectiveness of various metal ions in the steam treatment of the same whole oil sand sample. The tests which yielded the data were carried out in accordance with the experimental procedure outlined above. The metal ion concentration was kept constant for all entries in Table III.

It is to be understood that the scope of the invention is defined by the claims which now follow and that it is not limited to the specific best mode that has been described.

The embodiments of the invention in which an exclusive property or privilege is claimed are defined as follows:

1. A process for reducing the viscosity of heavy oil, comprising:
   contacting the heavy oil, at reservoir pressure under substantially anaerobic condition, with an aqueous solution containing at least one metal salt, the metal being selected from the group consisting of Ti, V, Cr, Mn, Fe, Co, Ni, Cu, Zn, Mo and Al, and sufficient steam to maintain the temperature in the reaction zone in the range 150°–300° C.

2. A process for reducing the viscosity of heavy oil, comprising:
   contacting the heavy oil, at reservoir pressure, with an aqueous solution containing at least one metal salt, the metal being selected from the group consisting of Ti, V, Cr, Mn, Fe, Co, Ni, Cu, Zn, Mo and Al, carbon monoxide, and sufficient steam to maintain the temperature in the reaction zone in the range 150°–300° C.

* * * * *